US009375851B2

United States Patent
Nagatsuka (10) Patent No.: US 9,375,851 B2
(45) Date of Patent: Jun. 28, 2016

(54) ARTICULAR STRUCTURE FOR ROBOT AND ROBOT WITH INCORPORATED ARTICULAR STRUCTURE

(71) Applicant: THK CO., LTD., Tokyo (JP)

(72) Inventor: Masaki Nagatsuka, Tokyo (JP)

(73) Assignee: THK CO., LTD., Tokyo (JP)

( * ) Notice: Subject to any disclaimer, the term of this patent is extended or adjusted under 35 U.S.C. 154(b) by 251 days.

(21) Appl. No.: 14/352,521

(22) PCT Filed: Oct. 19, 2012

(86) PCT No.: PCT/JP2012/077043
§ 371 (c)(1),
(2) Date: Apr. 17, 2014

(87) PCT Pub. No.: WO2013/061868
PCT Pub. Date: May 2, 2013

(65) Prior Publication Data
US 2014/0238177 A1    Aug. 28, 2014

(30) Foreign Application Priority Data
Oct. 24, 2011    (JP) .................................. 2011-233250

(51) Int. Cl.
*B25J 17/02*    (2006.01)

(52) U.S. Cl.
CPC .......... *B25J 17/0258* (2013.01); *B25J 17/0266* (2013.01); *Y10T 74/20335* (2015.01)

(58) Field of Classification Search
CPC ........ B25J 17/00; B25J 17/02; B25J 17/0258; B25J 17/0266; B25J 9/106; Y10T 74/20335
USPC ....................... 74/490.05, 490.06; 901/28, 29
See application file for complete search history.

(56) References Cited

U.S. PATENT DOCUMENTS 7,099,743 B2 * 8/2006 Lee ...................... B62D 57/032
  318/568.1
7,938,038 B2 * 5/2011 Sugawara ............ B25J 17/0258
  74/490.04

(Continued)

FOREIGN PATENT DOCUMENTS

JP    60-141497 A    7/1985
JP    08-300290 A    11/1996

(Continued)

OTHER PUBLICATIONS

International Search Report, dated Jan. 29, 2013, issued in corresponding application No. PCT/JP2012/077043.

(Continued)

*Primary Examiner* — David M Fenstermacher
*Assistant Examiner* — Leonard J Archuleta
(74) *Attorney, Agent, or Firm* — Westerman, Hattori, Daniels & Adrian, LLP (57) ABSTRACT

An articular structure for a robot according includes: a first intermediate link (26a) supported on a first member (22) to be rotatable about a first axis; a first arm (25a) having one end connected to a second member (23) with a ball joint interposed therebetween and the other end connected to the first intermediate link (26a) with a ball joint interposed therebetween; a first actuator (28a) for rotating the first intermediate link (26a) about the first axis; a second intermediate link (26b) supported on the first member (22) to be rotatable about a second axis; a second arm (25b) having one end connected to the second member (23) with a ball joint interposed therebetween and the other end connected to the second intermediate link (26b) with a ball joint interposed therebetween; and a second actuator (28b) for rotating the second intermediate link (26b) about the second axis.

7 Claims, 8 Drawing Sheets

(56) References Cited

U.S. PATENT DOCUMENTS

| | | | |
|---|---|---|---|
| 8,322,250 B2 * | 12/2012 | Kim | B25J 17/0275 74/490.05 |
| 2003/0101838 A1 | 6/2003 | Shinozaki | |
| 2008/0075561 A1 * | 3/2008 | Takemura | F16F 1/025 414/2 |
| 2009/0071282 A1 * | 3/2009 | Takemura | B25J 15/0009 74/490.05 |
| 2011/0071671 A1 | 3/2011 | Ihrke et al. | |
| 2011/0071673 A1 | 3/2011 | Ihrke et al. | |
| 2011/0185837 A1 * | 8/2011 | Alfayad | B62D 57/032 74/490.05 |

FOREIGN PATENT DOCUMENTS

| | | |
|---|---|---|
| JP | 09-001491 A | 1/1997 |
| JP | 09-234638 A | 9/1997 |
| JP | 2003-170381 A | 6/2003 |
| JP | 2005-066723 A | 3/2005 |
| JP | 2009-184049 A | 8/2009 |
| JP | 2010-155335 A | 7/2010 |
| JP | 2011-067932 A | 4/2011 |
| JP | 2011-067933 A | 4/2011 |
| JP | 2011-131304 A | 7/2011 |

OTHER PUBLICATIONS

Pre-Trial Reexamination Report dated Dec. 24, 2013, corresponding Japanese Patent Application No. 2011-233250, with English translation (7 pages).

* cited by examiner

ARTICULAR STRUCTURE FOR ROBOT AND ROBOT WITH INCORPORATED ARTICULAR STRUCTURE

TECHNICAL FIELD

The present invention relates to an articular structure for a robot and a robot into which the articular structure is incorporated and particularly to an articular structure for a robot including a first member and a second member, in which the second member is rotated relative to the first member about two axes perpendicular to each other, and a robot into which the articular structure is incorporated.

BACKGROUND ART

In recent years, not only industrial robots but also consumer robots for taking various roles are researched and developed lively. Among the robots, humanoid robots which can walk upright are expected to be able to replace human action. Such a humanoid robot has joints in leg portions, arm portions, a neck portion, and the like and can make movements similar to human movements.

As joints for the robot, there are various joints having one to three or higher degrees of freedom. The degree of freedom refers to the number of directions in which the joint can move. For example, a joint which can rotate only about a pitch axis has one degree of freedom and a joint which can rotate about two axes, i.e., a pitch axis and a yaw axis has two degrees of freedom. In a prior-art articular structure for a robot, it is common practice to combine two or more rotary servomotors in order to achieve a joint with two or higher degrees of freedom. In other words, two or more rotary servomotors are prepared and combined so that rotary shafts of the rotary servomotors are perpendicular to each other (e.g., refer to Patent Literature

CITATION LIST

Patent Literature

Patent Literature 1: JP 2009-184049 A

SUMMARY OF INVENTION

Technical Problems

However, in the prior-art articular structure in which the two or more rotary servomotors are combined, the servomotors receive rotation moment and therefore loads on the servomotors are large and large-output, i.e., large-size motors are required. As a result, it is impossible to reduce the articular structure in size.

Moreover, in achieving the articular structure with two or higher degrees of freedom, it is difficult to dispose two or more rotary servomotors so that rotary shafts are orthogonal to each other. This is because the first servomotor needs to be wrapped in the hollow second servomotor in order to make the rotary shafts orthogonal to each other, which complicates structures of the servomotors.

The present invention solves the above-described problems of the prior-art articular structure for the robot and its object is to provide an articular structure for a robot, with which a joint with two or higher degrees of freedom can be achieved and the joint can be reduced in size, and a robot into which the articular structure for the robot is incorporated.

Solution to Problems

To solve the above-described problems, an aspect of the present invention provides an articular structure for a robot, with a second member rotating relative to a first member about two axes perpendicular to each other, the articular structure including: a first intermediate link supported on the first member to be rotatable about a first axis; a first arm having one end connected to the second member with a ball joint interposed therebetween and the other end connected to the first intermediate link with a ball joint interposed therebetween; a first actuator for rotating the first intermediate link about the first axis; a second intermediate link supported on the first member to be rotatable about a second axis; a second arm having one end connected to the second member with a ball joint interposed therebetween and the other end connected to the second intermediate link with a ball joint interposed therebetween; and a second actuator for rotating the second intermediate link about the second axis. The invention is not limited to the articular structure having two degrees of freedom and can be applied to articular structures having three or higher degrees of freedom, if a third intermediate link, a third arm, a third actuator, and the like are added to the structure.

Advantageous Effects of Invention

According to the one aspect of the invention, by simultaneously actuating the first and second actuators, the second member rotates relative to the first member about the two axes perpendicular to each other. Because the first and second actuators are actuated simultaneously, as compared with the prior-art articular structure formed by combining the rotary servomotors, it is possible to generate several-fold power. Conversely, it is possible to miniaturize the first and second actuators for obtaining necessary power and the articular structure can be miniaturized.

Because the first and second intermediate links are interposed between the first and second actuators and the first and second arms, a load applied on the second member can be received by the first and second intermediate links. Therefore, it is possible to prevent the load applied on the second member from directly acting on the first and second actuators to prevent unreasonable forces from acting on the first and second actuators. For example, if linear actuators are used as the first and second actuators, it is possible to prevent unreasonable forces such as radial loads, torsion, and moment other than axial forces from acting on shaft portions which move linearly in axial directions relative to main body portions.

DESCRIPTION OF EMBODIMENTS

Figure 1:
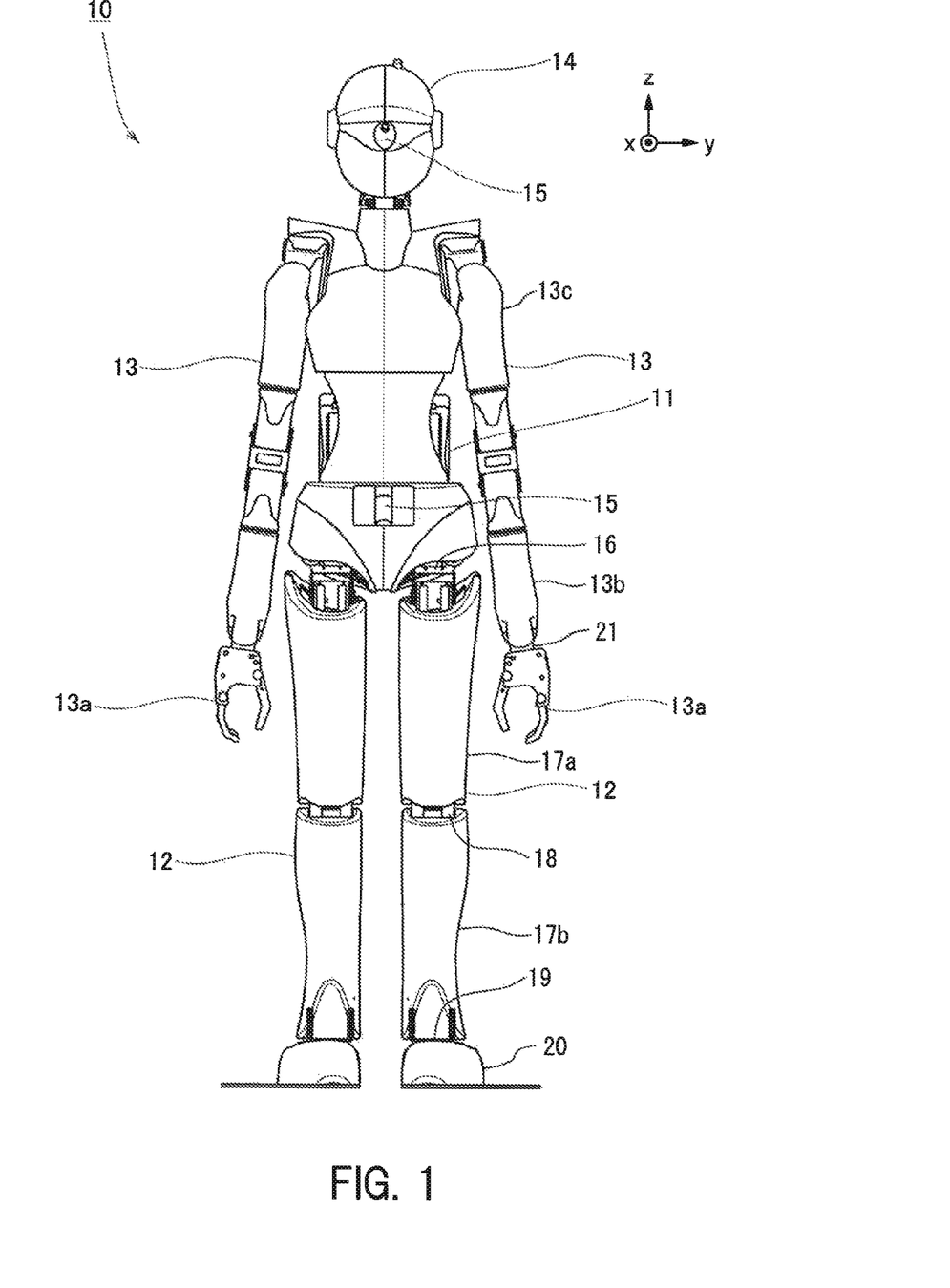
FIG. 1 illustrates a front view of a humanoid robot into which articular structures for a robot in first to third embodiments of the invention are incorporated.
Figure 2:
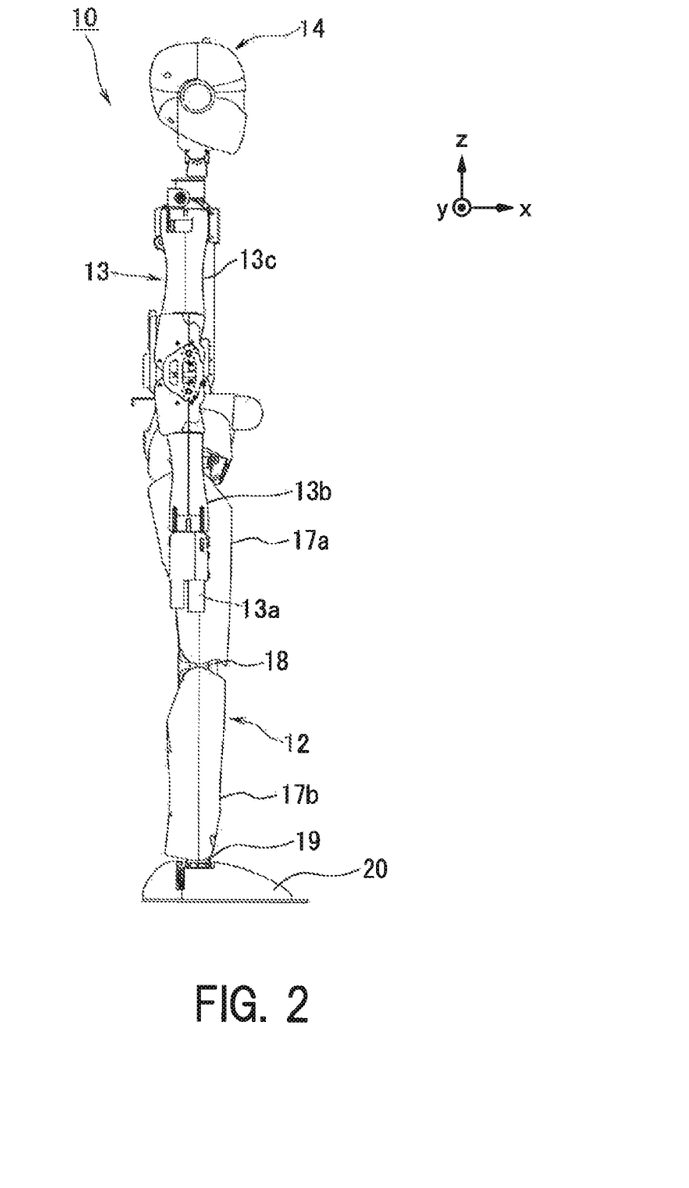
FIG. 2 illustrates a right side view of the humanoid robot.

Based on the accompanying drawings, an articular structure for a robot in a first embodiment of the present invention will be described. FIG. 1 illustrates a front view of a general structure of a humanoid robot into which articular structures for a robot are incorporated. FIG. 2 illustrates a right side view of the humanoid robot. In the present embodiment, right and left refer to right and left as viewed from the humanoid robot illustrated in the drawing.

The humanoid robot 10 includes two leg portions 12 disposed under a trunk portion 11, two arm portions 13 disposed on upper left and right opposite side faces of the trunk portion 11, and a head portion 14 disposed above the trunk portion 11 and can move similarly to humans.

The two arm portions 13 can move freely around the trunk portion 11. Each of the arm portions 13 has an upper arm portion 13c close to a shoulder and a lower arm portion 13b close to a hand portion 13a on opposite sides of an elbow. At a tip end of the lower arm portion 13b, the hand portion 13a is disposed with a wrist joint 21 interposed therebetween. By using the hand portion 13a, it is possible to grasp or pick an object.

The humanoid robot 10 is a biped walking robot and walks while balancing itself with two legs like humans. Each of the leg portions 12 is connected to a pelvis of the trunk portion 11 with a hip joint 16 interposed therebetween. The hip joint 16 allows each of the leg portions 12 to rotate about a yaw axis, a pitch axis, and a roll axis. Here, if a direction of movement of the humanoid robot is an x-axis positive direction, a leftward direction as viewed from the robot is a y-axis positive direction, and an upward direction from the robot is a z-axis direction, an x-axis is referred to as the roll axis, a y-axis is referred to as the pitch axis, and a z-axis is referred to as the yaw axis. Rotation about the x-axis is referred to as roll, rotation about the y-axis is referred to as pitch, and rotation about the z-axis is referred to as yaw.

A thigh portion 17a is connected to the hip joint 16. A knee joint 18 is provided under the thigh portion 17a. A shin portion 17b is connected to a lower portion of the knee joint 18. An ankle joint 19 is provided under the shin portion 17b. A foot portion 20 for coming in contact with a walking road surface is connected to a lower portion of the ankle joint 19.

CCD cameras 15 are respectively disposed at the head portion 14 and the trunk portion 11. With the CCD cameras 15, it is possible to capture image data of surroundings of the humanoid robot 10.

This humanoid robot 10 is a robot which can be operated remotely and can perform an action corresponding to a movement of an operation manipulator (not shown) in a remote position when an operator operates the operation manipulator. Therefore, the operator can grasp the surroundings of the humanoid robot 10 through wireless communication means such as an internet connection and the CCD cameras 15 disposed in the humanoid robot 10 and can operate the humanoid robot 10 while the operator is in the remote place.

Figure 3:
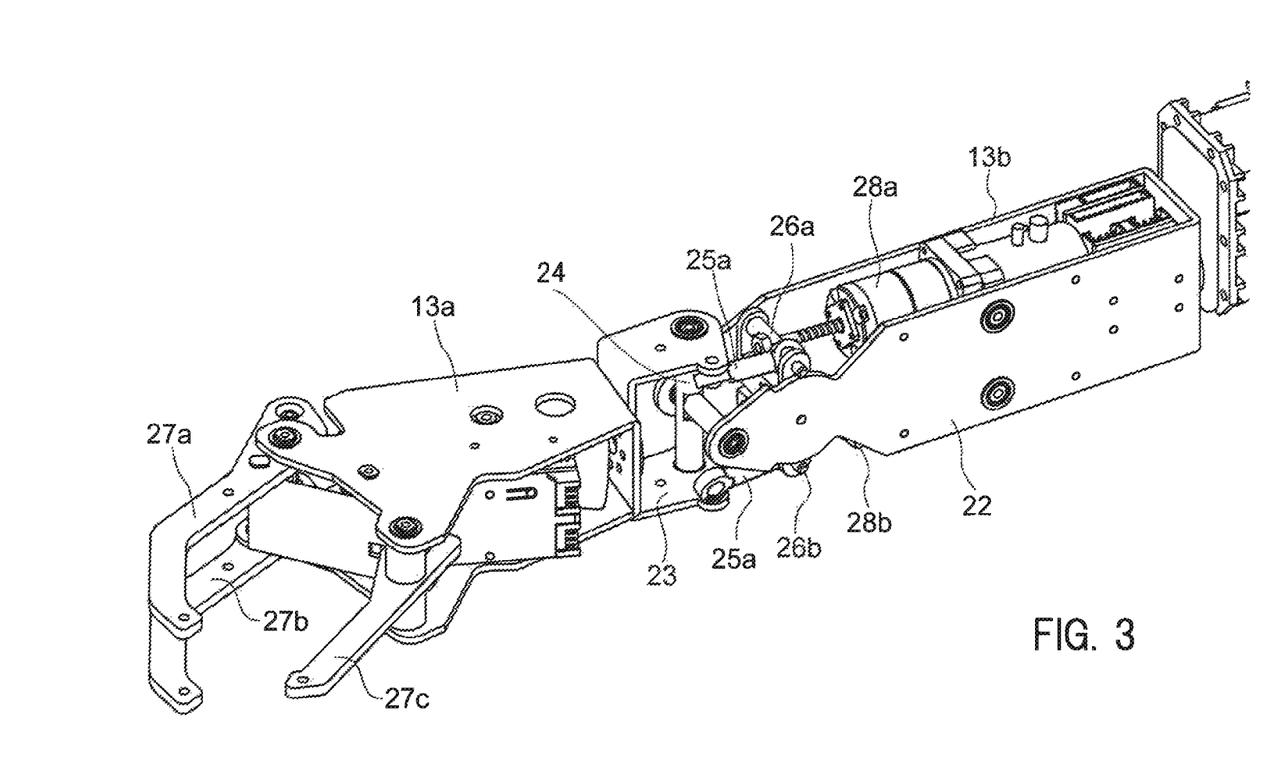
FIG. 3 illustrates a perspective view of a wrist joint to which the articular structure for the robot in the first embodiment of the invention is applied.

FIG. 3 illustrates a perspective view of the wrist joint of the robot into which the articular structure for the robot in the first embodiment of the invention is incorporated. The articular structure for the robot in the embodiment is incorporated into the wrist joint 21 between the lower arm portion 13b and the hand portion 13a. The articular structure for the robot in the embodiment includes a lower arm portion frame 22 as a first member, a movable frame 23 as a second member, a universal joint 24 for connecting the lower arm portion frame 22 and the movable frame 23 for rotation, first and second arms 25a and 25b, first and second intermediate links 26a and 26b, and first and second linear actuators 28a and 28b as first and second actuators.

The movable frame 23 is rotatable relative to the lower arm portion frame 22 about two axes perpendicular to each other and has two degrees of freedom. In the lower arm portion frame 22, first and second linear actuators 28a and 28b which function like human muscle are housed parallel. When the first and second linear actuators 28a and 28b perform pushing and pulling movements, the movable frame 23 rotates about the two axes perpendicular to each other.

The hand portion 13a is fixed to the movable frame 23. A plurality of fingers 27a to 27c are provided to the hand portion 13a. The plurality of fingers 27a to 27c can be bent so as to be able to grasp or pick an object.

Figure 4A:
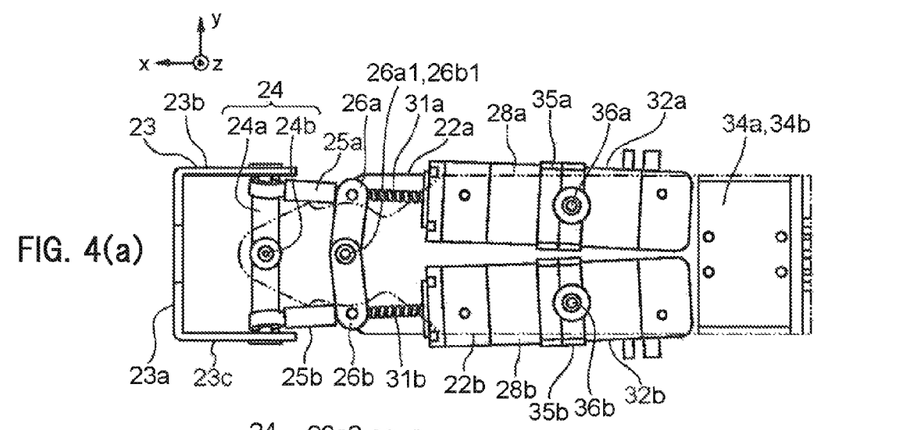
FIGS. 4(a) to 4(c) illustrate detail views of the articular structure for the robot in the first embodiment of the invention (FIG. 4(a) illustrates a side view and FIGS. 4(b) and 4(c) illustrate perspective views from the same direction as FIG. 3).
Figure 4B:
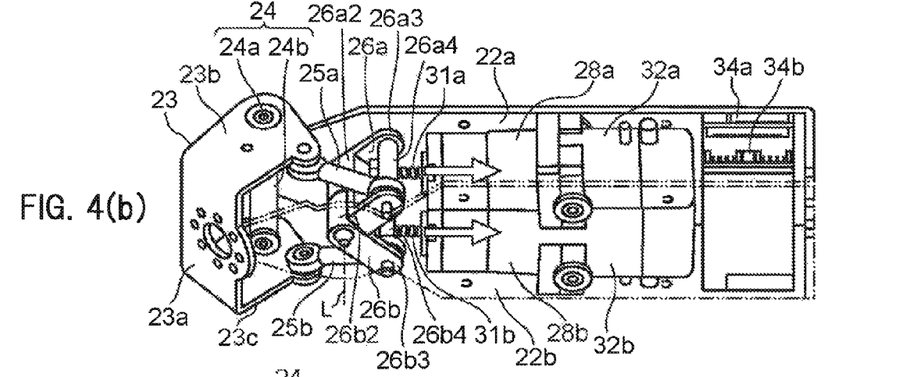
Figure 4C:
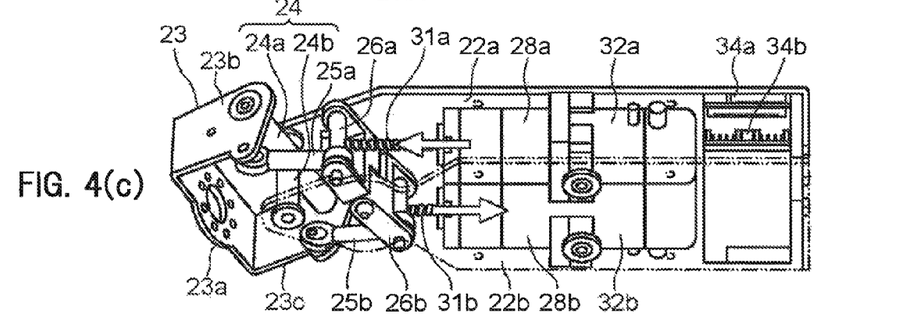

FIGS. 4(a) to 4(c) illustrate detail views of the articular structure. FIG. 4(a) illustrates a side view of the articular structure and FIGS. 4(b) and 4(c) illustrate perspective views from the same direction as FIG. 3. FIG. 4(b) illustrates a state in which the first and second linear actuators 28a and 28b pull in shaft portions 31a and 31b in the same direction and FIG. 4(c) illustrates a state in which the first and second linear actuators 28a and 28b pushes and pulls the shaft portions 31a and 31b in different directions.

As shown in FIG. 4(b), if the first and second linear actuators 28a and 28b pull in the shaft portions 31a and 31b in the same direction, the movable frame 23 rotates about the pitch axis. As shown in FIG. 4(c), if the first and second linear actuators 28a and 28b pushes and pulls the shaft portions 31a and 31b in the different directions, the movable frame 23 rotates about the yaw axis. Here, as shown in FIG. 4(a), a length direction of the lower arm portion frame 22 is an x-axis positive direction, an upward direction in FIG. 4(a) is a y-axis positive direction, and a direction orthogonal to a paper surface of FIG. 4(a) is a z-axis direction. The x-axis is the roll axis, the y-axis is the pitch axis, and the z-axis is the yaw axis. The movable frame 23 is rotating about the pitch axis (a pitch shaft portion 24a of the universal joint 24) in FIG. 4(b) and the movable frame 23 is rotating about the yaw axis (a yaw shaft portion 24b of the universal joint 24) in FIG. 4(c).

The lower arm portion frame 22 includes paired parallel opposed plates 22a and 22b extending in the length direction of the lower arm portion 13b. The opposed plates 22a and 22b are integrally connected to a connecting plate at end portions in the length direction. Between the paired opposed plates 22a and 22b, the first and second linear actuators 28a and 28b are housed substantially parallel.

The movable frame 23 includes a mounting plate 23a to which the hand portion 13a is mounted and paired support plates 23b and 23c bent to be perpendicular to the mounting plate 23a and parallel to each other.

To a tip end of the lower arm portion frame 22, a cross-shaped shaft body 24 as the universal joint 24 is mounted. The shaft body 24 has the pitch shaft portion 24a and the yaw shaft portion 24b forming the two axes perpendicular to each other. In the embodiment, axes of the pitch shaft portion 24a and the yaw shaft portion 24b are orthogonal to each other in a plane. The yaw shaft portion 24b is mounted like a bridge between the paired opposed plates 22a and 22b and rotatably supported between the paired opposed plates 22a and 22b. The pitch shaft portion 24a is mounted like a bridge between the paired support plates 23b and 23c of the movable frame 23 and rotatably connected to the paired support plates 23b and 23c. Because the shaft body 24 is supported on the lower arm portion frame 22 to be rotatable about the yaw shaft portion 24b and the movable frame 23 is connected to the shaft body 24 to be rotatable about the pitch shaft portion 24a, the movable frame 23 can rotate relative to the lower arm portion frame 22 about the pitch shaft portion 24a and the yaw shaft portion 24b perpendicular to each other. It is essential only that the axes of the pitch shaft portion 24a and the yaw shaft portion 24b be perpendicular to each other and the axes may be away from each other without being orthogonal to each other.

The first and second linear actuators 28a and 28b respectively include cylindrical main body portions 32a and 32b and the shaft portions 31a and 31b for moving linearly in axial directions relative to the main body portions 32a and 32b. The first and second linear actuators 28a and 28b have the same structures. The shaft portions 31a and 31b are disposed on axes of the main body portions 32a and 32b. Helical thread grooves are formed on outer peripheral faces of the shaft portions 31a and 31b. In the main body portions 32a and 32b, ball screw nuts (not shown) to be engaged by screwing with the thread grooves of the shaft portions 31a and 31b are housed. In the main body portions 32a and 32b, the ball screw nuts are housed while only allowed to rotate about the axes. In the main body portions 32a and 32b, servomotors for rotating the ball screw nuts are housed as well. When the servomotors rotate the ball screw nuts, the shaft portions 31a and 31b move linearly in the axial directions, because axial movements of the ball screw nuts are restricted.

The main body portions 32a and 32b of the first and second linear actuators 28a and 28b are rotatably supported on the lower arm portion frame 22. The main body portions 32a and 32b are fitted in rectangular frame portions 35a and 35b (refer to FIG. 4(a)) of the main body portions 32a and 32b. The rectangular frame portions 35a and 35b include rotary shafts 36a and 36b (refer to FIG. 4(a)) and are rotatably supported on the lower arm portion frame 22. The main body portions 32a and 32b of the first and second linear actuators 28a and 28b can swing about the rotary shafts 36a and 36b. The rotary shafts 36a and 36b are parallel to the yaw shaft portion 24b of the shaft body 24. The two first and second linear actuators 28a and 28b are arranged in a vertical direction and the two rotary shafts 36a and 36b are also arranged in the vertical direction.

Between the first and second linear actuators 28a and 28b and the shaft body 24, the first and second intermediate links 26a and 26b are rotatably provided. The first and second intermediate links 26a and 26b can rotate independently of each other. The first intermediate link 26a is rotatable about a first axis 26a1 (refer to FIG. 4(a)) and the second intermediate link 26b is rotatable about a second axis 26b1 (refer to FIG. 4(a)). In the embodiment, the first axis 26a1 and the second axis 26b1 are positioned on the same straight line L (refer to FIG. 4(b)) and the first and second intermediate links 26a and 26b rotate about the common straight line L. A rotary shaft supporting the first and second intermediate links 26a and 26b for rotation is mounted like a bridge between the paired opposed plates 22a and 22b and is parallel to the yaw shaft portion 24b of the shaft body 24.

As shown in FIG. 4(b), the first and second intermediate links 26a and 26b respectively include base portions 26a2 and 26b2 rotatably supported on the rotary shaft, bracket portions 26a3 and 26b3 formed by bifurcating the base portions 26a2 and 26b2, and connecting shafts 26a4 and 26b4 rotatably supported on the bracket portions 26a3 and 26b3. The base portions 26a2 and 26b2 have axial lengths which are halves of a length between the paired opposed plates 22a and 22b so that they can be housed between the paired opposed plates 22a and 22b. The bracket portions 26a3 and 26b3 support the connecting shafts 26a4 and 26b4 for rotation. The bracket portions 26a3 and 26b3 have widths substantially equal to the entire length between the paired opposed plates 22a and 22b. When an angle between the first and second intermediate links 26a and 26b is a predetermined angle, e.g., 90 degrees or smaller, the bracket portion 26a3 of the first intermediate link 26a and the bracket portion 26b3 of the second intermediate link 26b come in contact with each other to prevent the angle between the first intermediate link 26a and the second intermediate link 26b from becoming smaller than the predetermined angle. To the connecting shafts 26a4 and 26b4, tip ends of the shaft portions 31a and 31b of the first and second linear actuators 28a and 28b are connected.

Figure 5:
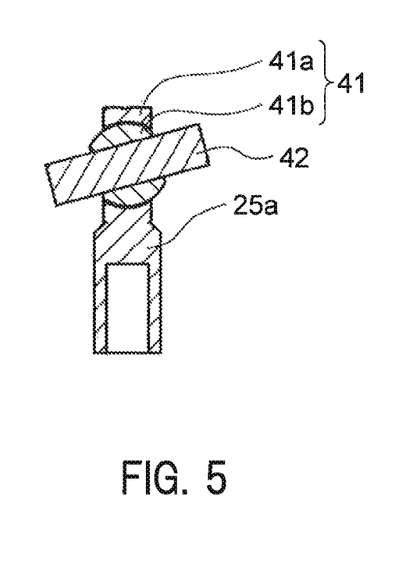
FIG. 5 illustrates a sectional view of a ball joint incorporated into first and second arms.

Between the movable frame 23 and the first intermediate link 26a, a first arm 25a is mounted like a bridge. Ball joints are provided to both end portions in a length direction of the first arm 25a and the first arm 25a is connected to the movable frame 23 and the connecting shaft 26a4 of the first intermediate link 26a by the ball joints. FIG. 5 illustrates a sectional view of the ball joint 41 incorporated into the end portions of the first arm 25a. The ball joint 41 is a joint having three degrees of freedom and is formed by a spherical bearing having a structure in which an inner ring 41b and an outer ring 41a are in spherical contact with each other, for example. The outer ring 41a is connected to the first arm 25a. A shaft body 42 protruding from the movable frame 23 is connected to the inner ring 41b. The inner ring 41b can rotate relative to the outer ring 41a about three axes orthogonal to each other. As the ball joint, a Link Ball (a name of a product manufactured by THK CO., LTD) joint can be used, for example.

As shown in FIG. 4(b), a second arm 25b is mounted like a bridge between the movable frame 23 and the second intermediate link 26b. The same ball joints as those of the first arm 25a are provided to both end portions in a length direction of the second arm 25b. The second arm 25b is connected to the movable frame 23 and the connecting shaft 26b4 of the second intermediate link 26b by the ball joints.

Between the opposed plates 22a and 22b of the lower arm portion frame 22, first and second drivers 34a and 34b for controlling the servomotors of the first and second linear actuators 28a and 28b are provided to be adjacent to the first and second linear actuators 28a and 28b. Each of the first and second drivers 34a and 34b includes a power inverter such as a PWM (pulse width modulation) inverter for supplying electric power to the servomotor, a sensor for detecting speed and a position of an output shaft of the servomotor, and a controller for controlling the power inverter based on commands from the operation manipulator and information from the sensor. The first and second drivers 34a and 34b communicate with each other and can move synchronously without a special control box. It is also possible to control the two servomotors with a single driver formed by integrating the first and second drivers 34a and 34b.

As shown in FIG. 4(b), when the commands are given to the first and second drivers 34a and 34b and the first and second linear actuators 28a and 28b pull in the shaft portions 31a and 31b in the same direction, the first intermediate link 26a and the second intermediate link 26b rotate in opposite directions from each other. In this example, the upper first intermediate link 26a rotates clockwise while the lower second intermediate link 26b rotates counterclockwise. If the first and second intermediate links 26a and 26b rotate in the opposite directions from each other, the first and second arms 25a and 25b are pulled in and the movable frame 23 connected to the first and second arms 25a and 25b rotates only about the pitch shaft portion 24a. On the other hand, if the first and second linear actuators 28a and 28b push out the shaft portions 31a and 31b in the same direction, the movable frame 23 rotates in a reverse direction only about the pitch shaft portion 24a.

As show in FIG. 4(c), when the commands are given to the first and second drivers 34a and 34b and the first linear actuator 28a pushes out the shaft portion 31a while the second linear actuator 28b pulls in the shaft portion 31b, the first and second intermediate links 26a and 26b rotate in the same direction. In this example, both of the upper first intermediate link 26a and the lower second intermediate link 26b rotate counterclockwise. If the first and second intermediate links 26a and 26b rotate counterclockwise, the first arm 25a is pushed out and the second arm 25b is pulled in. As a result, the movable frame 23 connected to the first and second arms 25a and 25b rotates only about the yaw shaft portion 24b. On the other hand, if the first linear actuator 28a pulls in the shaft portion 31a while the second linear actuator 28b pushes out the shaft portion 31b, the movable frame 23 rotates in the reverse direction only about the yaw shaft portion 24b.

Although the example in which the movable frame 23 is rotated only about the pitch shaft portion 24a or the yaw shaft portion 24b is described by using FIGS. 4(b) and 4(c), it is also possible that the movable frame 23 rotates about the yaw shaft portion 24b while rotating about the pitch shaft portion 24a.

The articular structure for the robot in the first embodiment exerts the following effects. In order to rotate the movable frame 23 about the two axes perpendicular to each other, the first and second linear actuators 28a and 28b are actuated simultaneously. Therefore as compared with the prior-art articular structure formed by combining the rotary servomotors, it is possible to generate several-fold power. Conversely, it is possible to miniaturize the first and second linear actuators 28a and 28b for obtaining necessary power and the articular structure can be miniaturized.

By rotating the first and second intermediate links 26a and 26b in the opposite directions, the movable frame 23 is rotated about the pitch shaft portion 24a. By rotating the first and second intermediate links 26a and 26b in the opposite directions, the movable frame 23 is rotated about the yaw shaft portion 24b. Because a cause-and-effect relationship between the rotation of the first and second intermediate links 26a and 26b and the rotation of the movable frame 23 about the pitch shaft portion 24a and the yaw shaft portion 24b is easy to understand, it is easy to control the first and second linear actuators 28a and 28b.

The first and second intermediate links 26a and 26b are interposed between the first and second arms 25a and 25b and the first and second linear actuators 28a and 28b and a load applied on the movable frame 23 is received by the first and second intermediate links 26a and 26b. Therefore, it is possible to prevent the load applied on the movable frame 23 from directly acting on the shaft portions 31a and 31b of the first and second linear actuators 28a and 28b to prevent unreasonable forces such as radial loads, torsion, and moment other than axial forces from acting on the shaft portions 31a and 31b.

The ball joints having three degrees of freedom are provided to the both end portions in the length direction of the first and second arms 25a and 25b. Therefore, even when the movable frame 23 rotates about the pitch shaft portion 24a and the yaw shaft portion 24b, it is possible to prevent unreasonable forces from the movable frame 23 from acting on the first and second intermediate links 26a and 26b.

The main body portions 32a and 32b of the first and second linear actuators 28a and 28b are rotatably supported on the lower arm portion frame 22 and the shaft portions 31a and 31b of the first and second linear actuators 28a and 28b are rotatably connected to the first and second intermediate links 26a and 26b. Therefore, when the shaft portions 31a and 31b of the first and second linear actuators 28a and 28b move in the axial directions, the first and second linear actuators 28a and 28b swing about the rotary shafts 36a and 36b. As a result, even when the first and second intermediate links 26a and 26b rotate, it is possible to prevent unreasonable forces such as radial loads, torsion, and moment other than axial forces from acting on the shaft portions 31a and 31b of the first and second linear actuators 28a and 28b.

When the angle between the first intermediate link 26a and the second intermediate link 26b is the predetermined angle, the first intermediate link 26a and the second intermediate link 26b come in contact with each other. By causing the first intermediate link 26a and the second intermediate link 26b to serve as a stopper, it is possible to maintain a certain rotation angle of the movable frame 23, even if supply of electric power to the first and second linear actuators 28a and 28b is stopped.

By providing the first and second drivers 34a and 34b for controlling the first and second linear actuators 28a and 28b to the lower arm portion frame 22, it is easy to achieve synchronous operations of the first and second actuators 28a and 28b. Moreover, it is possible to omit wiring.

Because the shaft body 24 as the universal joint includes the pitch shaft portion 24a and the yaw shaft portion 24b orthogonal to each other in a plane, it is possible to rotate the movable frame 23 relative to the lower arm portion frame 22 about the two axes orthogonal to each other. However, it is essential only that the pitch shaft portion 24a and the yaw shaft portion 24b be perpendicular to each other and the shaft portions 24a and 24b may be away from each other without being orthogonal to each other in a plane.

Figure 6A:
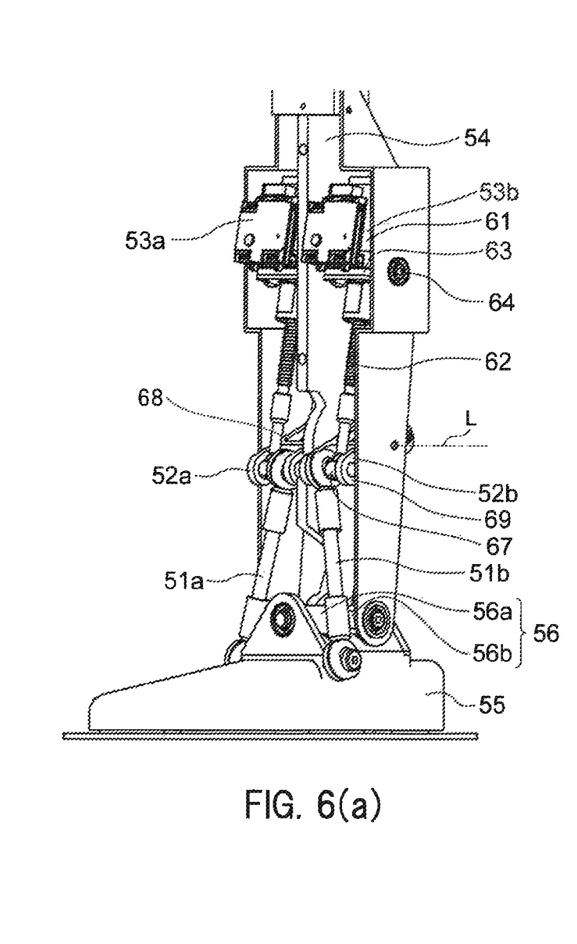
FIGS. 6(a) and 6(b) illustrate perspective views of an ankle joint to which the articular structure for the robot in the second embodiment of the invention is applied (FIG. 6(a) illustrates a state in which a foot frame is rotated about a pitch axis and FIG. 6(b) illustrates a state in which the foot frame is rotated about a roll axis).
Figure 6B:
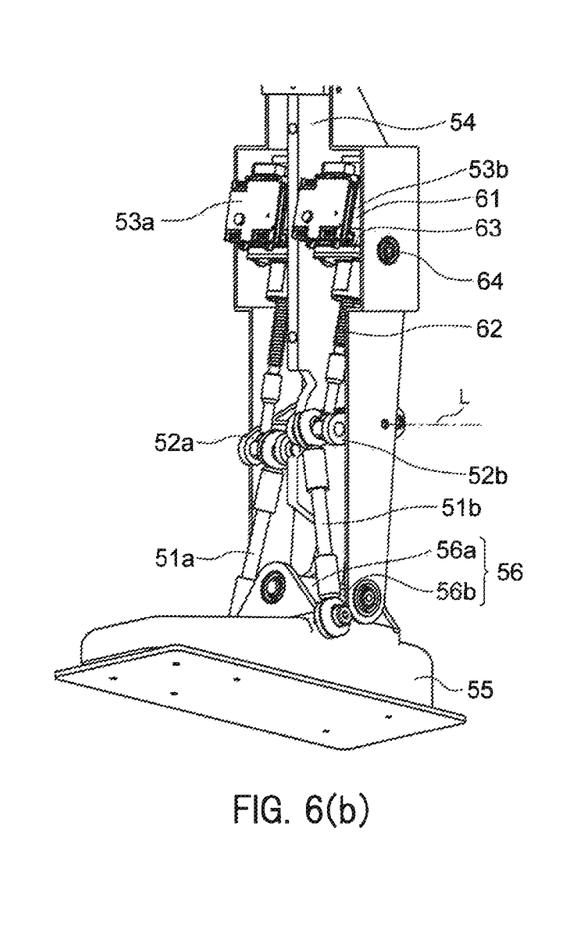

FIGS. 6(a) and 6(b) illustrate the ankle joint of the robot into which an articular structure for a robot in a second embodiment of the invention is incorporated. The articular structure for the robot in the present embodiment is applied to each of the ankle joints 19 (refer to FIG. 1) of the humanoid robot 10. A basic structure of the articular structure for the robot in the embodiment is the same as the articular structure for the robot in the first embodiment and includes first and second arms 51a and 51b, first and second intermediate links 52a and 52b, and first and second linear actuators 53a and 53b. By causing the first and second linear actuators 53a and 53b to operate, a foot portion frame 55 is rotated about the pitch axis and the roll axis relative to a shin portion link 54.

At a lower end of the shin portion link 54, a cross-shaped shaft body 56 having a pitch shaft portion 56a and a roll shaft portion 56b is provided as a universal joint. The pitch shaft portion 56a of the shaft body 56 is rotatably mounted to the shin portion link 54. The roll shaft portion 56b of the shaft body 56 is rotatably mounted to the foot portion frame 55. The foot portion frame 55 is rotatable relative to the shin portion link 54 about the pitch shaft portion 56a and the roll shaft portion 56b.

On a back side of the shin portion link 54 in the drawings, the first linear actuator 53a, the first intermediate link 52a, and the first arm 51a are disposed. On a front side, the second linear actuator 53b, the second intermediate link 52b, and the second arm 51b are disposed.

Each of the first and second linear actuators 53a and 53b includes a rectangular parallelepiped main body portion 61 and a shaft portion 62 for moving linearly in an axial direction relative to the main body portion 61. The first and second linear actuators 53a and 53b have the same structures. Although an outside shape of the main body portion 61 is different from that in the first embodiment, a basic structure of the main body portion 61 is the same as that in the first embodiment. In the main body portion 61, a servomotor and a ball screw nut driven for rotation by the servomotor are provided. A helical thread groove is formed on an outer peripheral face of the shaft portion 62. When the servomotor drives the ball screw nut for rotation, the shaft portion 62 engaged by screwing with the ball screw nut moves linearly in the axial direction.

The first and second linear actuators 53a and 53b are supported by the shin portion link 54 to be rotatable about the pitch shaft. Frame-shaped holders 63 are fixed to the shin portion link 54. In the frame shaped holders 63, rotary shafts 64 of the first and second linear actuators 53a and 53b are rotatably fitted. The rotary shafts 64 of the first and second linear actuators 53a and 53b are disposed on the same straight line.

At positions of the shin portion link 54 below the first and second linear actuators 53a and 53b, the first and second intermediate links 52a and 52b are rotatably supported. The first and second intermediate links 52a and 52b are rotatable about axes parallel to the pitch axis. The axis of the first intermediate link 52a and the axis of the second intermediate link 52b are disposed on the same straight line L. Each of the first and second intermediate links 52a and 52b includes a base portion 68 and a bracket portion 69 formed by bifurcating the base portion 68 (refer to FIG. 6(a)). A connecting shaft 67 is rotatably supported on the bracket portion 69. The connecting shaft 67 is parallel to the pitch axis. Tip ends of the shaft portions 62 of the first and second linear actuators 53a and 53b are fixed to the connecting shafts 67.

The first and second intermediate links 52a and 52b and the foot portion frame 55 are connected by the first and second arms 51a and 51b. Upper end portions of the first and second arms 51a and 51b are connected to connecting shafts 67 of the first and second intermediate links 52a and 52b by ball joints. Lower end portions of the first and second arms 51a and 51b are connected to the foot portion frame 55 by ball joints. Positions where the first and second arms 51a and 51b and the foot portion frame 55 are connected are displaced from axes of the pitch shaft portion 56a and the roll shaft portion 56b of the shaft body 56.

As shown in FIG. 6(a), if the first and second linear actuators 53a and 53b rotate the first and second intermediate links 52a and 52b in the same direction, the foot portion frame 55 connected to the first and second arms 51a and 51b rotates about the pitch shaft portion 56a.

As shown in FIG. 6(b), if the first and second linear actuators 53a and 53b rotate the first and second intermediate links 52a and 52b in opposite directions, the foot portion frame 55 connected to the first and second arms 51a and 51b rotates about the roll shaft portion 56b.

Figure 7:
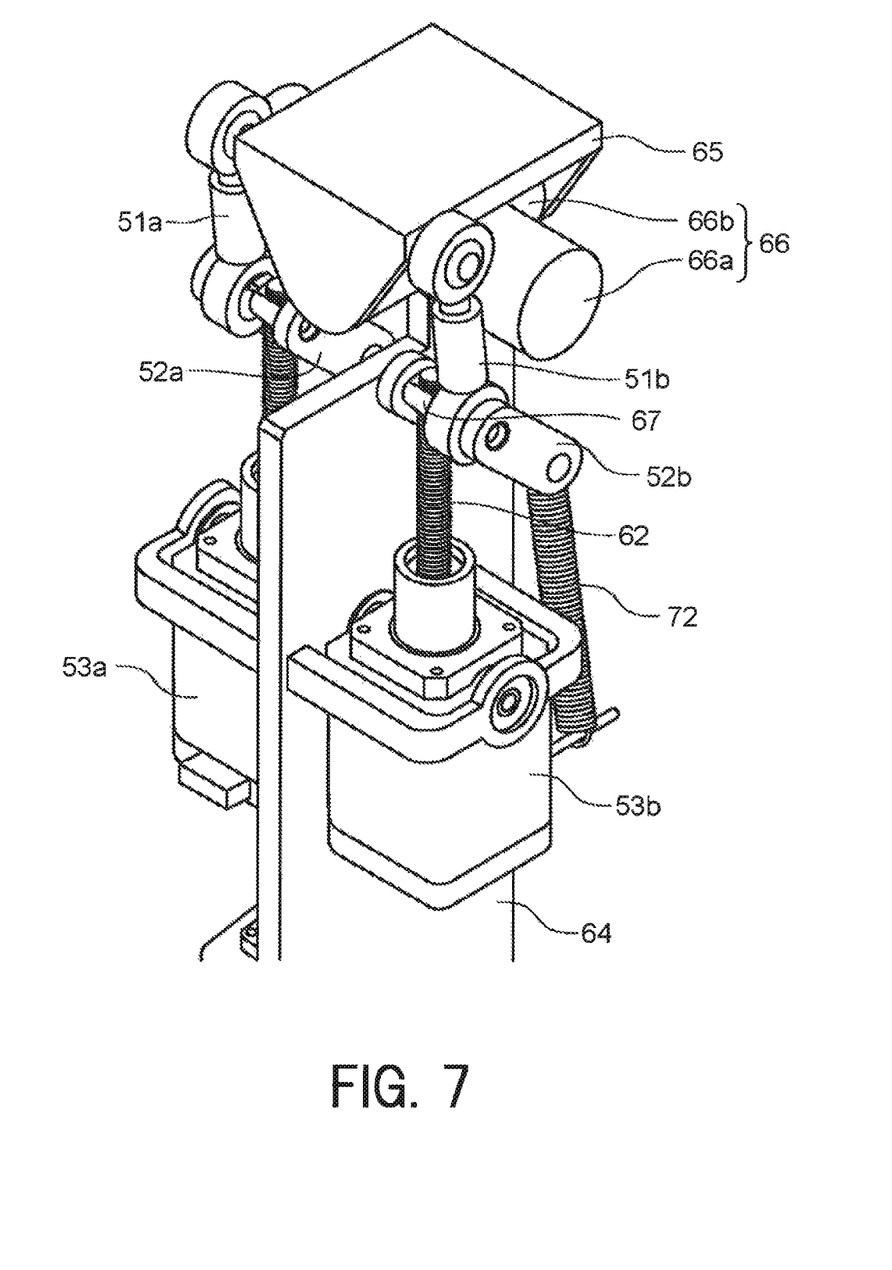
FIG. 7 illustrates a perspective view of a hip joint to which the articular structure for the robot in the third embodiment of the invention is applied.
Figure 8A:
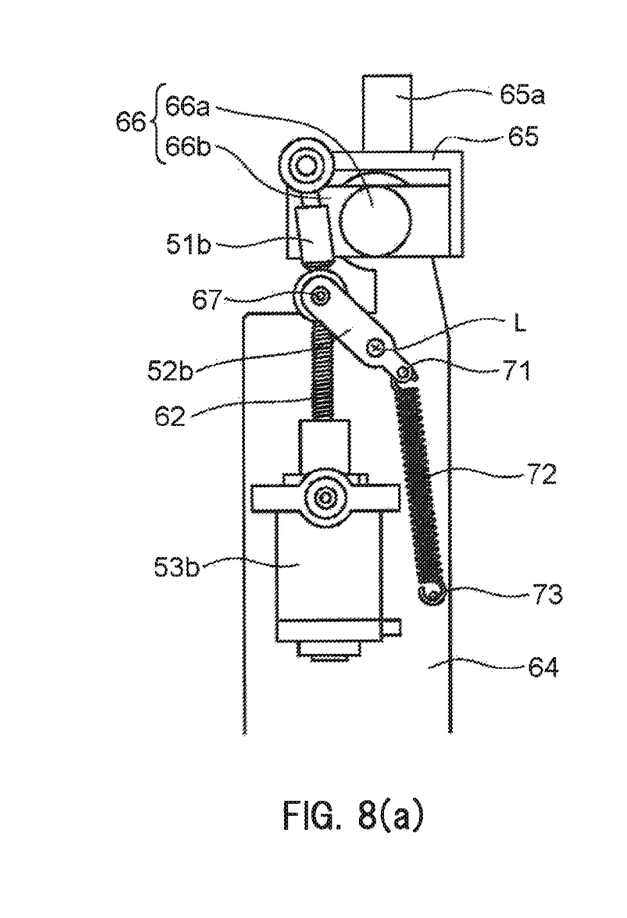
FIGS. 8(a) and 8(b) illustrate side views of the articular structure for the robot in the third embodiment of the invention (FIG. 8(a) illustrates a state in which a thigh portion link is straight and FIG. 8(b) illustrates a state in which the thigh portion link is bent).
Figure 8B:
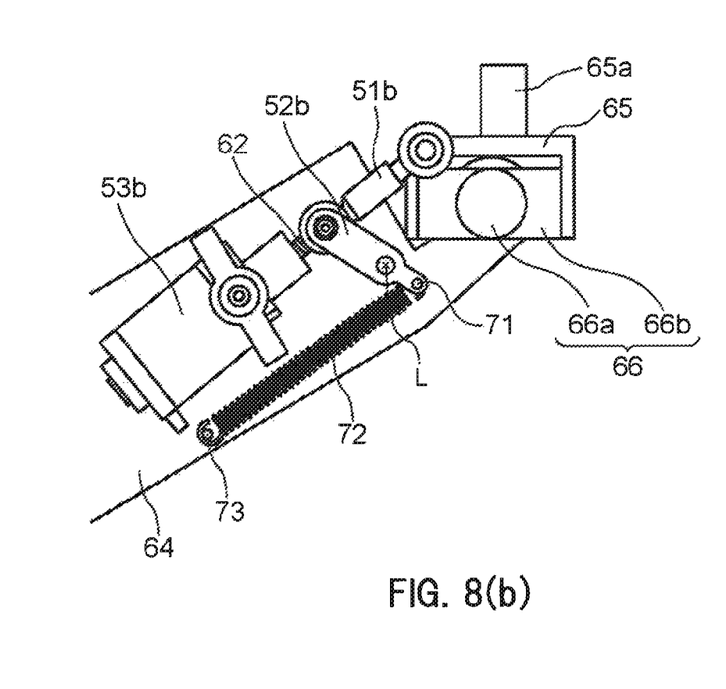

FIG. 7 illustrates a perspective view of an articular structure for a robot in the third embodiment of the invention. The articular structure for the robot in the present embodiment is incorporated into the hip joint 16 of the humanoid robot 10. FIGS. 8(a) and 8(b) illustrate side views of the articular structure for the robot. FIG. 8(a) illustrates a state in which a thigh portion link 64 is straight and FIG. 8(b) illustrates a state in which the thigh portion link 64 is bent in order to perform a stepping operation of the leg portion 12. By rotating the thigh portion link 64 relative to a hip joint frame 65 about a pitch shaft portion 66a and a roll shaft portion 66b, the stepping operation of the leg portion 12 can be performed. Orientation of the leg portion 12 can be changed by rotating the hip joint frame 65 about a yaw shaft 65a.

As shown in FIG. 7, the articular structure for the robot in the third embodiment includes first and second linear actuators 53a and 53b, first and second intermediate links 52a and 52b, and first and second arms 51a and 51b as well. If the thigh portion link 64 in FIG. 7 is regarded as the shin portion link 54 in FIG. 6 and the hip joint frame 65 in FIG. 7 is regarded as the foot portion frame 55 in FIG. 6, the articular structure for the robot in the third embodiment is substantially the same as the articular structure for the robot in the second embodiment. If FIG. 7 is flipped vertically, the articular structure becomes similar to the articular structure for the robot shown in FIG. 6. Here, in order to avoid repetition of the description, the same structures as those of the articular structure for the robot in the second embodiment shown in FIG. 6 will be provided with the same reference signs and will not be described.

As shown in FIGS. 8(a) and 8(b), in the embodiment, first and second intermediate links 52a and 52b (only the second intermediate link 52b is shown in FIGS. 8(a) and 8(b)) are extending from a common axis L to an opposite side of a connecting shaft 67. A spring mounting portion 71 is provided to a extending portion of each of the first and second intermediate links 52a and 52b. Each of the first and second intermediate links 52a and 52b is provided on one side of the common axis L with the connecting shaft 67 and on the other side with the spring mounting portion 71. One end of a coil spring 72 is hung on the spring mounting portion 71. The other end of the coil spring 72 is hung on a spring support portion 73 fixed to the thigh portion link 64. The coil spring 72 is a tension spring and has such a length as to constantly generate tensile force when the first or second intermediate link 52a or 52b rotates.

As shown in FIGS. 8(a) and 8(b), if the first and second linear actuators 53a and 53b simultaneously pull in shaft portions 62, the first and second intermediate links 52a and 52b rotate counterclockwise about the axis L and the thigh portion link 64 is lifted. When the thigh portion link 64 is lifted, the coil springs 72 generate greater tensile force and give such torque to the first and second intermediate links 52a and 52b that they return. In this way, it is possible to reduce loads applied on the first and second linear actuators 53a and 53b to reduce loads on servomotors in a shift back from the state in FIG. 8(b) to the state in FIG. 8(a). Moreover, because the coil spring 72 tries to return the thigh portion link 64 into the straight state as shown in FIG. 8(a), it is possible to stably maintain the robot in the upright state shown in FIG. 1, even if the first and second linear actuators 53a and 53b are powered off.

According to the articular structure for the robot in the third embodiment, because the spring is provided between each of the first and second intermediate links 52a and 52b and the thigh portion link 64 and the articular structure cancels out its own weight, the loads on the first and second linear actuators 53a and 53b reduce and it is possible to use small electric power and the small first and second linear actuators 53a and 53b.

In providing the gravity cancelling coil spring 72 as in the embodiment, it is common practice to provide the coil spring 72 like a bridge between the thigh portion link 64 and the hip joint frame 65. However, the thigh portion link 64 has two degrees of freedom with respect to the hip joint frame 65. Therefore, if the coil spring 72 is provided like the bridge between the thigh portion link 64 and the hip joint frame 65, the coil spring 72 may stick out to a periphery or may hit other structures. By providing the coil springs 72 like bridges between the thigh portion link and the first and second intermediate links 52a and 52b, the coil springs 72 are housed better.

The invention is not limited to the structures embodied in the above-described embodiments and can be changed in various ways without changing the gist of the invention.

Although the articular structure for the robot in the invention is applied to the wrist joint, the ankle joint, and the hip joint in the examples described in the above embodiments, it may be applied to other joints such as a neck joint, a shoulder joint, and a waist joint for bending an upper body forward and backward.

The invention is not limited to the humanoid robot and can be applied to industrial robots such as vertical multijoint robots and horizontal multijoint robots.

The invention is not limited to the articular structure having the two degrees of freedom and can be applied to articular structures having three or higher degrees of freedom, if a third intermediate link, a third arm, a third actuator, and the like are added to the structure.

The first and second actuators are not limited to the linear actuators in the above embodiments and various actuators for converting rotary motions into linear motions can be used, if the first and second actuators can rotate the first and second intermediate links.

Although one examples of the first and second arms and first and second intermediate links have been described in the above embodiments, their shapes and structures are not limited to those in the above embodiments and can be changed in various ways without changing the gist of the invention.

The present specification is based on Japanese Patent Application No. 2011-233250 filed on Oct. 24, 2011 which is incorporated herein by reference.

REFERENCE SIGNS LIST

22 . . . lower arm portion frame (first member), 23 . . . movable frame (second member), 24 . . . shaft body (universal joint), 24a . . . pitch shaft portion, 24b . . . yaw shaft portion, 25a, 25b . . . first and second arms, 26a, 26b . . . first and second intermediate links, 26a1 . . . first axis, 26b1 . . . second axis, 28a, 28b . . . first and second linear actuators, 31a, 31b . . . shaft portions of first and second linear actuators, 32a, 32b . . . main body portions of first and second linear actuators, 34a, 34b . . . first and second drivers, 41 . . . ball joint, 51a, 51b . . . first and second arms, 52a, 52b . . . first and second intermediate links, 53a, 53b . . . first and second linear actuators, 54 . . . shin portion link (first member), 55 . . . foot portion frame (second member), 56 . . . shaft body (universal joint), 56a . . . pitch shaft portion, 56b . . . roll shaft portion, 61 . . . main body portions of first and second linear actuators, 62 . . . shaft portions of first and second linear actuators, 64 . . . thigh portion link (first member), 65 . . . hip joint frame (second member), 66 . . . shaft body (universal joint), 66a . . . pitch shaft portion, 66b . . . roll shaft portion, 72 . . . coil spring (spring)

The invention claimed is:

1. An articular structure for a robot, with a second member rotating relative to a first member about two axes perpendicular to each other, the articular structure comprising:
a first intermediate link supported on the first member to be rotatable about a first axis;
a first arm having one end connected to the second member with a ball joint interposed therebetween and the other end connected to the first intermediate link with a ball joint interposed therebetween;
a first actuator for rotating the first intermediate link about the first axis;
a second intermediate link supported on the first member to be rotatable about a second axis;
a second arm having one end connected to the second member with a ball joint interposed therebetween and the other end connected to the second intermediate link with a ball joint interposed therebetween; and
a second actuator for rotating the second intermediate link about the second axis, wherein
the first axis of the first intermediate link and the second axis of the second intermediate link are positioned on the same straight line.
each of the first and second actuators includes a main body portion, a shaft portion with a helical thread groove formed on an outer peripheral face thereof and a ball screw nut housed in the main body portion and engaged with the thread groove of the shaft portion, the first and second actuators being linear actuators each including the shaft portion for moving linearly relative to the main body portion when the ball screw nut is rotated,
the main body portion of each of the first and second actuators is rotatably supported on the first member, and
a tip end of the shaft portion of each of the first and second actuators is fixed to a connecting shaft rotatably supported on a bracket portion of each of the first and second intermediate links.

2. The articular structure for the robot according to claim 1, wherein, when the first and second actuators rotate the first and second intermediate links in the same direction, the second member rotates relative to the first member about one of the two axes perpendicular to each other and,
when the first and second actuators rotate the first and second intermediate links in opposite directions, the second member rotates relative to the first member about the other of the two axes perpendicular to each other.

3. The articular structure for the robot, with a second member rotating relative to a first member about two axes perpendicular to each other, the articular structure comprising:
a first intermediate link supported on the first member to be rotatable about a first axis;
a first arm having one end connected to the second member with a ball joint interposed therebetween and the other end connected to the first intermediate link with a ball joint interposed therebetween;
a first actuator for rotating the first intermediate link about the first axis;
a second intermediate link supported on the first member to be rotatable about a second axis;
a second arm having one end connected to the second member with a ball joint interposed therebetween and the other end connected to the second intermediate link with a ball joint interposed therebetween; and a second actuator for rotating the second intermediate link about the second axis, wherein the first axis of the first intermediate link and the second axis of the second intermediate link are positioned on the same straight line, when the first and second actuators rotate the first and second intermediate links in the same direction, the second member rotates relative to the first member about one of the two axes perpendicular to each other and, when the first and second actuators rotate the first and second intermediate links in opposite directions, the second member rotates relative to the first member about the other of the two axes perpendicular to each other, and the first intermediate link and the second intermediate link come in contact with each other in order to prevent an angle formed between the first intermediate link and the second intermediate link from becoming smaller than a predetermined angle when the angle formed between the first intermediate link and the second intermediate link is the predetermined angle.

4. The articular structure for the robot according to claim 1, wherein a spring for biasing at least one of the first and second intermediate links for rotation in one direction is disposed between at least of the first and second intermediate links and the first member.

5. The articular structure for the robot according to claim 1,
wherein the first member and the second member are connected by a joint having two axes orthogonal to each other in a plane, and the first member is rotatably connected to one of the two axes orthogonal to each other and the second member is rotatably connected to the other of the two axes orthogonal to each other.

6. The articular structure for the robot according to claim 1, wherein the first member is provided with a driver for controlling the first and second actuators.

7. A robot into which the articular structure for the robot according to claim 1 is incorporated.

\* \* \* \* \*